United States Patent [19]

Page et al.

[11] Patent Number: 4,951,062
[45] Date of Patent: Aug. 21, 1990

[54] PAPER TRANSPORT MECHANISM

[76] Inventors: Jeffrey L. Page, 658 Cambridge Dr., Santa Clara, Calif. 95051; Gary W. Zera, 693 Portofino La., Foster City, Calif. 94404

[21] Appl. No.: 282,485

[22] Filed: Dec. 12, 1988

[51] Int. Cl.$^5$ .......................... G01D 9/00; B65H 5/02
[52] U.S. Cl. ..................................... 346/1.1; 346/136; 346/134; 271/273
[58] Field of Search ................ 346/134, 136, 145, 1.1; 271/272, 273, 274

[56] References Cited

U.S. PATENT DOCUMENTS 4,720,714  1/1988  Yukio ................................. 346/134

FOREIGN PATENT DOCUMENTS 0191222  8/1986  European Pat. Off. ............ 346/134

Primary Examiner—Bruce A. Reynolds
Assistant Examiner—Huan Tran
Attorney, Agent, or Firm—Bernhard Kreten

[57] ABSTRACT

A paper transport mechanism for grasping paper between a pressure roller and a drive shaft. The pressure roller moves from a retracted position to a force applying position and is supported by a housing which includes a depending underlying support carriage cantilevered from the housing and oriented to oppose the downwardly extending force of the pressure roller. Damping within the housing offsets vibrations generated between the drive shaft and the pressure roller.

17 Claims, 2 Drawing Sheets

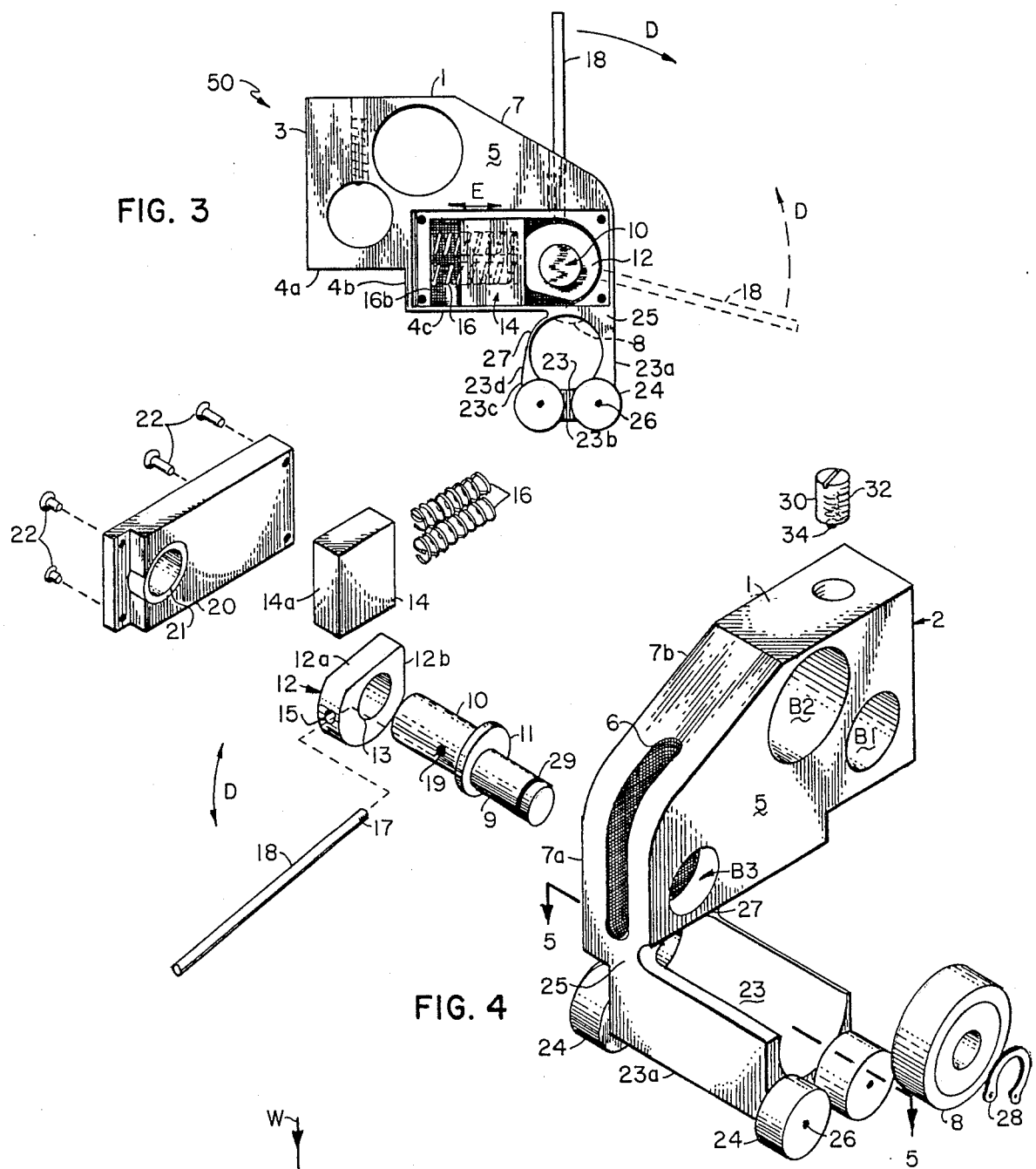
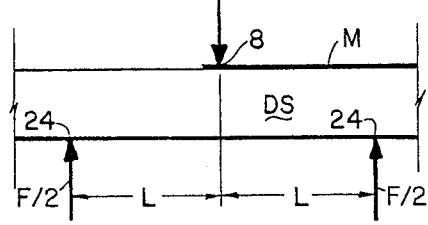
FIG. 6
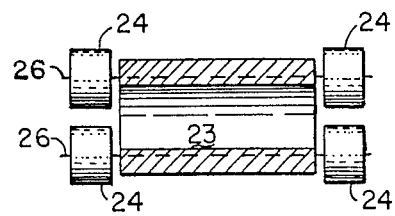
FIG. 5
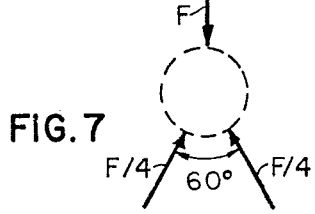
FIG. 7

1

PAPER TRANSPORT MECHANISM

FIELD OF THE INVENTION

The following invention relates generally to a driving shaft and a cooperating pressure roller between which material is captured and is driven linearly in a plane defined by the tangent between the pressure roller and the drive shaft. More specifically, this invention describes a means for linearly translating medium to be strategically contacted by a pen or other writing instrument commonly used in computer driven plotters.

BACKGROUND OF THE INVENTION

Computer driven plotters are in common use for various types of engineering and graphics display. Typically, a pen dispenses ink on a medium such as paper, velum, etc., and both the pen and paper move during the process. The pen itself will move transverse to the direction of paper motion, and the paper motion is typically in both directions along its length. When the pen moves alone, horizontal lines (i.e., transverse to the longitudinal axis of the paper) will be displayed. When just the paper moves, the lines on the paper will be vertical. When both the pen and the paper move simultaneously, various curves can be drawn based on the relative motion in these two directions. Obviously, it is essential that the mechanism which grasps the paper does so securely and without slippage.

Most paper transport mechanism used with plotters grasp the page or medium to be drawn upon at longitudinally extending outboard edges. A lower surface of the paper's edge is contacted by a driving shaft which is coated with an abrasive compound which actually secures the paper along the area of contact, impressing a unique tractive pattern on the paper corresponding to the abrasive pattern on the shaft. In order to effectively distort the paper in this manner, a pressure roller overlies the drive shaft at that point of paper penetration and presses the paper against the drive shaft. As the paper advances back and forth in the plane of travel, the impression created in the paper by the abrasive driving shaft must always contact the driving shaft at precisely the same points to assure alignment with the corresponding transverse motion of the pen for quality plotting. In effect, the driving shaft imparts a friction "gear" pattern on the paper with which it always meshes when it drives the paper along the paper's longitudinal axis.

The universally accepted industry practice is shown in FIG. 1. The medium M is interposed between a drive shaft DS and a pressure roller PR. As the drive shaft DS moves in the direction of the double-ended arrow A, the medium M moves in accordance with the arrow C. In order to reliably drive the medium M, a substantial force F must be present between the pressure roller PR and the drive shaft DS. Typically, this force is in the order of 9 to 20 pounds of pressure applied by the pressure roller PR. Two observations are in order. First, in order to impart this pressure F, an angular force B must be delivered to the pressure roller through an interconnected pressure roller arm. The pressure roller arm is carried on a support shaft PSS which also carries and supports the pen. Note that there is a reaction force F' imposed upon the shaft PSS.

Second, the force F imposed by the pressure roller PR must be resisted by the driving shaft DS in some manner. As this is a close tolerance system, it is important to not have the drive shaft flex. Thus, the prior art provides a plurality of shaft support rollers SSR strategically placed under the drive shaft DS. However, since the pressure roller arm is capable of being placed along the longitudinal axis of the pen support shaft, this solution is not entirely satisfactory.

Thus, larger diameter driving shafts have been used to resist shaft flexing. Typically, the design of the mechanism which turns the driving shaft must take into account the shaft's weight. This results from the necessity in having the shaft change direction frequently and accelerate quickly. Thus, hollow tubes with relatively thick walls are used to reduce weight. Although larger tubes having greater diameters can in most cases resolve the problems associated with shaft flexing, they do so at the expense of response time for the shaft. With the increased diameter, inertia and angular momentum inefficiencies increase.

SUMMARY OF THE INVENTION

The instant invention is distinguished over the known prior art in a plurality of ways. Most, notably, the downward pressure exerted by the pressure roller through the paper and onto the driving shaft is counteracted by an upwardly directed pressure on a remote side of the shaft thereby eliminating the problem of shaft flexing. This means a driving shaft having a minimal diameter can be used and thus requires a smaller drive mechanism associated therewith. With a smaller shaft, changes in the direction of motion for the drive shaft can occur more quickly and with fewer system inefficiencies.

Second, unlike prior art systems which require completely true shafts having no warps or bows, the instant invention will reliably transport a medium such as paper reliably even if the shaft is not perfectly straight.

Third, a single support carriage underlying the shaft and positioned strategically with respect to the pressure roller eliminates the need for a plurality of support rollers underlying the shaft found on prior art devices. Because all of the force exerted by the pressure roller is offset by an underlying carriage, the shaft needs only to be able to support the pressure roller housing which is typically in the order of one ounce, as compared to the prior art which must be able to support 9 to 20 pounds of pressure.

Fourth, by carefully controlling the angle of attack of the pressure roller according to the present invention, it is automatically self-aligning with respect to the way it addresses the drive shaft, unlike the prior art.

Fifth, because the system is more responsive, the traditional limiting factor in plotter speed, i.e., the shaft geometry has been obviated thereby allowing improved performance.

In its essence, the instant invention is directed to a housing which supports a pressure roller on a top most portion of a drive shaft which bears upon the drive shaft through an interposed medium, such as paper which is to be translated along a horizontal plane. A underlying carriage is also supported by the housing and is provided with rollers which are strategically oriented to straddle the pressure roller, on either side thereof, equidistant from the pressure exerted by the pressure roller. Since the spacing between the underlying rollers associated with the support carriage is relatively small, the shaft deflection is not a design criteria. Indeed, shafts that are slightly bowed can be suitable for use because of the forces exerted between the support carriage on the bottom and the pressure roller on top.

It is important to note that whereas in prior art systems, the necessity to apply sufficient pressure by the pressure roller caused a concomitant engineering problem with respect to the shaft which supports the pen, no such problem exists with respect to the instant invention because the forces applied on the driving shaft are not transmitted to the pen shaft. Thus, the pen shaft itself does not need to be over designed.

OBJECTS OF THE INVENTION

Accordingly, it is a primary object of the present invention to provide a novel and useful paper transport mechanism particularly to be used with computer driven plotters.

A further object of the present invention is to provide a device as characterized above which is extremely safe to use, durable in construction, and lends itself to mass production techniques.

A further object of present invention contemplates providing a device as characterized above which results in improved performance with respect to the plotter since the system does not have to be over designed to compensate for shaft flexing.

It is yet a further object of the present invention to provide a device as characterized above where the area of contact between the drive shaft and the pressure roller is carefully controlled and therefore facilitates self-alignment, promulgating reliable drive to the medium such as paper which is being oscillated in a linear direction.

A further object of the present invention is to provide a device as characterized above which not only removes engineering concern with respect to potential drive shaft flexing, but also allows the system to be used with drive shafts which are slightly bowed.

A further object of the present invention contemplates providing a device as characterized above which focuses the requisite pressure necessary along the surface between the pressure roller and the drive shaft and does not transfer this pressure to other parts of the mechanism which do not require it.

Viewed from one vantage point, it is an object of the present invention to provide in improvement in plotters which scribe on a medium which moves with respect to a scribing pen where the medium is driven by a drive shaft, the improvement includes: a pressure roller which urges the medium against the drive shaft and a drive shaft support carriage symmetrically supporting a surface of the drive shaft opposed from the medium and the pressure roller whereby flexing of the shaft is minimized and accurate aligned driving of the medium is enhanced.

Viewed from a second vantage point, it is an object of the present invention to provide a paper transport mechanism comprising a pressure roller, a drive shaft, paper interposed between the pressure roller and the drive shaft, an instrumentality for pressing the pressure roller against the shaft to provide a reliable friction drive for the paper, and an instrumentality for negating any shaft flexing tendency caused by the pressing instrumentality, wherein the negating instrumentality is integrally formed with the pressing instrumentality so that even moving the pressure roller along the length of the drive shaft will still prevent shaft flexing.

Viewed from a third vantage point, it is an object of the present invention to provide a method for offsetting flexing of a shaft when it is exposed to a point force transverse to its longitudinal axis, the steps including: administering the point force from a frame, supporting an offsetting force administering instrumentality from the frame, orienting the instrumentality to diametrically oppose the point force on the shaft, and administering the offsetting force through the shaft whereby the shaft sees forces of compression and not a bending moment.

These and other objects will be made manifest when considering the following detailed specification when taken in conjunction with the appended drawing figures.

BRIEF DESCRIPTION OF THE DRAWING FIGURES

FIG. 3 is a side view of that which is shown in FIG. 2 with portions shown schematically to provide insight.

FIG. 4 is an exploded parts perspective view of the apparatus according to the present invention.

FIG. 5 is a sectional view taken along lines 5—5 of FIG. 4.

FIG. 6 is a force vector diagram manifesting the theory of the invention.

FIG. 7 is a side view of a portion of FIG. 6 showing another aspect of the theory.

BRIEF DESCRIPTION OF THE PREFERRED EMBODIMENT

Figure 1:
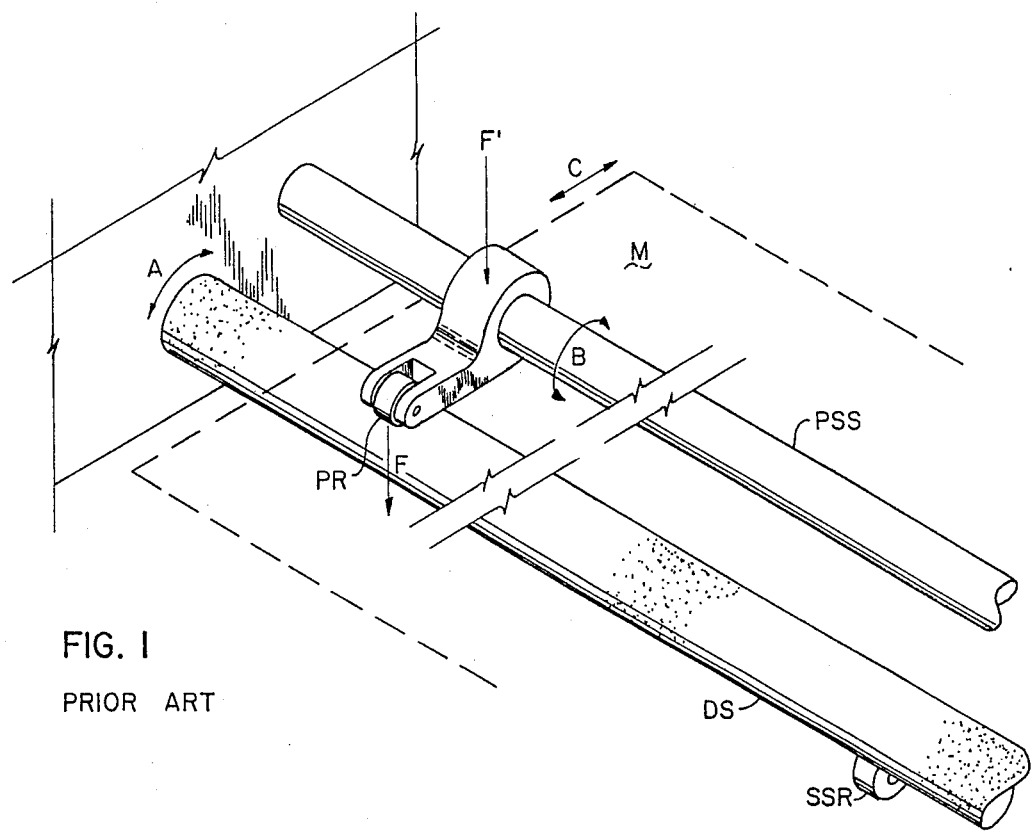
FIG. 1 is a perspective view of the prior art.

Referring to the drawings now, wherein like reference numerals refer to like parts throughout the various drawing figures, reference numeral 50 is directed to the paper transport mechanism particularly adapted for use with computer driven plotters according to the present invention.

In its essence, a housing 2 is used to support a pressure roller 8 which can move from a down, drive shaft contacting position to an upward, free position and an underlying carriage 23 to oppose the forces imposed by the pressure roller. Thus, when perfectly balanced in this manner, the shaft is merely supporting the weight of the housing, typically in the order of one ounce.

More specifically, the housing 2 is formed with a top wall 1, a rear wall 3, a bottom wall 4 having a first horizontal portion 4a, a vertical offset 4b and a further horizontal portion 4c to provide a stair-like lower contour. Side walls 5 extend from peripheral edges of the top, rear and bottom walls, thereby defining a housing having an open front wall. The front wall itself is partially open as shown in FIG. 4, and is provided with a vertical lower portion 7a and a rearwardly and upwardly declinated upper portion 7b. This front wall 7 includes a slit 6 extending both along the vertical and rearwardly extending portions. The significant of this slit 6 follows.

Note however, the presence of three bores. Bore B1 passes through side walls 5 of the housing and allows the pen shaft support PSS to pass therethrough. Bore B2 allows a second pen shaft to pass therethrough of conventional manufacture, and is used to raise and lower the pen. Bore B3 defines the portion of the housing which supports the pressure roller 8 and associated structure.

More specifically, the pressure roller 8 is fixed on an eccentric having an offset end 9 connected to a cylindrical section 10. The offset end 9 is connected to cylinder 10 by means if an annularly extending disc 11. The pressure roller is rotatably carried on the end 9 and fixed thereto by means of a circlip 28 adapted to be removably captured by a groove 29 finished on the end 9. An end of the eccentric remote from the pressure roller 8 communicates with a cam index 12. The cam index 12 includes two flat lobe surfaces, as shown in FIG. 4, a flat top lobe surface 12a and a rear lobe surface 12b. The cam index 12 and the cylindrical section 10 are capable of rotation along the direction of the arrow D under the urging of wand 18. The wand 18 fixes the cam index 12 to the cylindrical portion 10 by means of a threaded end 17 provided on the wand 18. The shaft of the wand 18 passed through a bore 15 on the cam index 12 and threading into a threaded orifice 19 on the cylindrical section 10. Note that the cam index 12 has a bore 13 whose inner dimension is complemental to the outer configuration of the cylinder 10 to snugly fit thereon.

Figure 2:
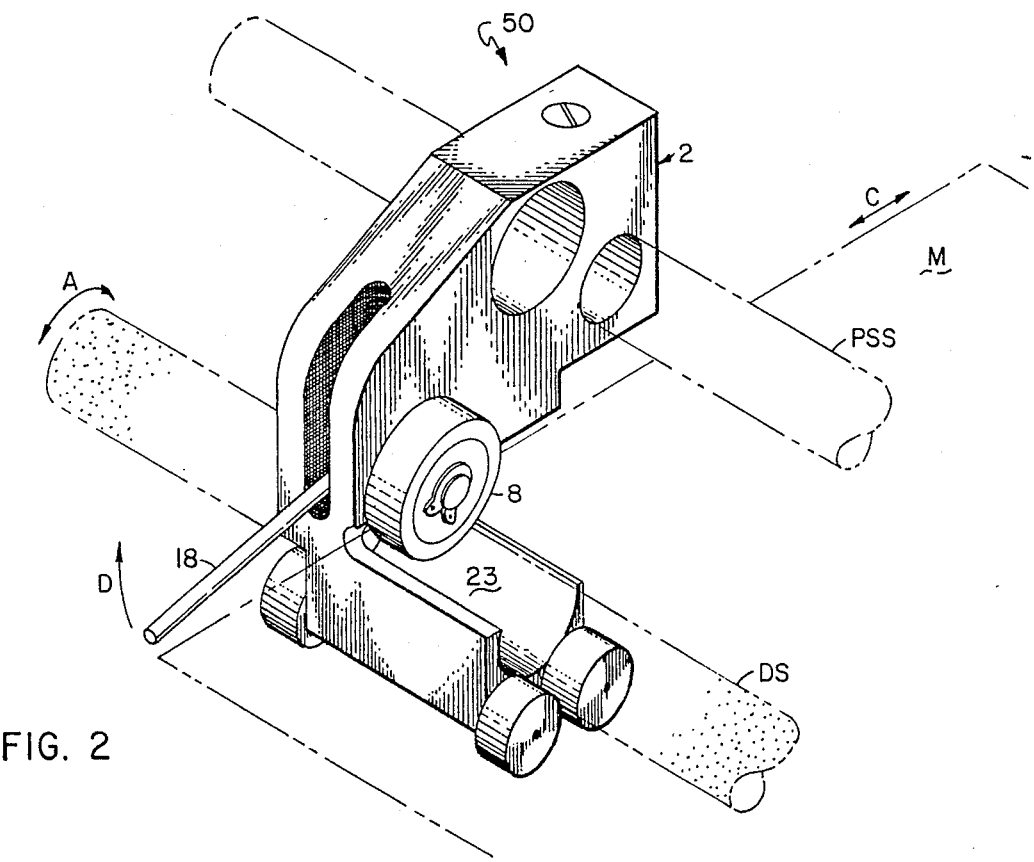
FIG. 2 is a perspective view of the apparatus according to the present invention.

When the wand 18 is moved between a deployed position shown in FIG. 2 wherein the pressure roller 8 contacts the drive shaft DS, and a retracted position shown in FIG. 3 in solid lines, the cam index 12 moves similarly between a first and second position. The first position shown in FIG. 2 allows the rear surface 12b of the cam index 12 to be contacted by a spring block 14 which is of substantially rectangular configuration. The spring block 14 has a surface 14a which contacts the rear lobe surface 12b and urges the cam index to remain in this position, against spring biasing by virtue of a pair of springs 16 wedged between a back wall recess 16b, formed within the housing 2 and spring recesses in block 14. The springs urge the spring block 14 toward the right of FIG. 3, in the direction of the arrow E. When the wand 18 is in the upper position shown in FIG. 3, the spring block 14 contacts the top lobe surface 12a of the cam index and provides similar spring biasing to hold the roller 8 in an upper, non-engaging position. When the pressure roller is thusly retracted, the housing can be translated along the length of the pen support shaft PSS engage the medium M at an appropriate point. Once the wand 18 is moved downwardly as shown in phantom in FIG. 3, the pressure roller bears against the drive shaft DS and since the medium M is interposed therebetween, provides a positive tractive force for the medium.

Besides allowing the roller 8 to translate between a first and second position, the springs 16 and the associated spring block 14 also provide damping for the entire system when the drive shaft DS is moving. Since the drive shaft is expected to move at relatively high speeds and change direction quite frequently, vibration would be discernable but for the presence of this shock-absorbing property. Thus, to a certain extent, a suspension system has been provided where the pressure roller 8 "floats" with respect to the drive shaft DS. This is a first resultant feature with respect to this above discussed geometry. A second feature allows the pressure roller 8 to be "self-aligning" with respect to the drive shaft. Because of the positive two-step position of the index 12 and its relationship with the spring block 14, the pressure roller positively addresses the drive shaft in the most geometrically beneficial manner, unlike the prior art. A third feature entails the ease with which subsequent media can be fed in the paper transport mechanism. By merely retracting the roller, a new medium can be interposed between the pressure roller and the drive shaft DS. Heretofore, one had to overcome the 9 to 20 pounds pressure that existed at all times on the drive shaft, imposed by prior art roller techniques.

Note that an access portal within the housing 2 is occluded by means of a door 20 which obscures the interior components described supra. The door 20 includes a bearing 21 which supports the free end of the cylindrical section 10. The door 20 is held in a closed position by a plurality of set screws 22 fastening the door 20 to the housing side wall 5.

In order to operate reliably, the structure thus far discussed would have to exert a downward pressure that varies between 9 and 20 pounds, depending upon the medium upon which the work is to be done and other factors. This is represented by the force vector F shown in FIG. 6. In addition, the housing and associated structure discussed supra represents an additional force noted by the vector W, denoting its weight. The presence of a force of this magnitude would tend to cause the drive shaft DS to experience a bending moment and certain deflection as is well-known from static beam loading theory. Prior art techniques include rigidly clamping the pressure roller support on the pen support shaft PSS and exerting a turning moment about the pen support shaft denoted by the arrow B in FIG. 1. Thus, the pressure roller in FIG. 1 must be tightly secured to the pen support shaft.

Attention is directed to FIG. 3 and 4 of the present invention which shows that the housing 2 is secured to the pen support shaft PSS via bore B1 by means of a grub screw 30. The screw 30 has internal biasing defined by a ball roller 34 which is spring biased via internal spring 32 to provide pressure on the pen support shaft PSS. The spring tension of the spring 32 is judiciously selected to allow the housing 2 to effectively "float" on the pen shaft PSS. This is not possible in prior art techniques. The reason this spring biased grub screw is the sole means of floating on the pen support shaft is shown with reference to FIG. 5 and illustrated through force diagrams of FIG. 6 and 7.

A support carriage 23 depends from the housing 2 and underlies and support the drive shaft DS. More specifically, the support carriage 23 is suspended from the bottom wall portion 4c of the housing 2 by a pair of downwardly extending web members 25, 27. The support carriage 23 includes a relatively thick bottom wall 23b, a substantially linear front wall 23a and an upwardly tapering rear wall 23d which is contoured to include a lower thickened portion 23c between 23d and 23b. The inner contour of the support carriage 23 is substantially semicylindrical so that the drive shaft DS rests smoothly therewithin. The thickened lower portion 23c and the bottom portion 23d include a pair of axles 26 which run the length of the carriage. Distal extremities of the axles 26 support drive shaft suport rollers 24 thereon.

As shown in FIG. 3, the rollers 24 extend upwardly and inwardly with respect to the semicylindrical support carriage 23 so that the drive shaft DS actually rides on the rollers 24. The support carriage 23 is cantilevered outwardly so that a major portion of the support carriage underlies the pressure roller 8. With reference to FIG. 6, the support carriage has an effective length 2L. The pressure roller 8 is located approximately centrally between the two pairs of rollers 24 and above the shaft DS. The net effect of the support rollers 24 when coupled with the force exerted by the pressure roller 8 is to provide a clamping motion with effectively causes the drive shaft DS to be securely clamped therebetween. The edge of the medium M between the drive shaft and the pressure roller 8 is firmly secured at a pressure whose magnitude F typically varies between 9 and 20 pounds of pressure. However, the forces seen by the drive shaft DS will not cause a bending moment as is known in the prior art because the downwardly extending force F is opposed by the upwardly extending forces exerted through the rollers 24 on the shaft, depicted in FIG. 6 as F/2. In a preferred form of the invention, the distance L is approximately three-quarters of one inch but as should be evident, L could be zero or of any length, depending upon the design parameters and the nature and thickness of the drive shaft DS. In the preferred embodiment, and as suggested in FIG. 7, two axles 26 support four rollers 24, so that the support carriage rollers 24 each support F/4 as its load. The vectors suggested in FIG. 7 suggest that the included angle between two adjacent rollers 24 on separate shafts 26 transfer a reaction force F/4 delivered at an included angle of 60 degrees between the two rollers. While it is possible to have a single roller diametrically opposed from the pressure roller 8, or a single pair, the cradle afforded by the four rollers 24 each a distance from rollers 8 appears easier to engineer. Moreover, it reduces the stress imposed upon any set of carriage rollers and negates the effect of a bowed shaft.

In use and operation, the paper transport mechanism 50 initially has its wand 18 deployed in an up, vertical position as shown in FIG. 3. The paper or other medium M is interposed between the drive shaft and the upwardly raised pressure roller 8. When the medium is appropriately registered in the plotter, the wand 18 is moved downwardly to its deployed position shown in FIG. 2. This causes a clamping of the pressure roller 8 against the drive shaft. This force is opposed and offset by the rollers 24 contained under the drive shaft and carried by the cantilevered support carriage 23. Thus, the drive shaft DS only sees the effective weight W of the housing and its associated components. In addition, the pen support shaft PSS secures the housing 2 by a light floating pressure imparted by the spring pressure contained within the grub screw 30. Unlike prior art devices, which has a reaction force F' imposed upon the shaft PSS and the requisite turning moment B, the pen support shaft is relatively unstressed. The drive shaft DS can then move along the direction of the double ended arrow A at a relatively rapid speed, since a substantially smaller diameter shaft can be used. In addition, unlike the prior art, the shaft support rollers SRR of FIG. 1 are no longer necessary to be spaced along the length of the drive shaft DS.

Having thus described the invention, it should be apparent that numerous structural modifications and adaptations may be resorted to without departing from the scope and fair meaning of the instant invention as taught in the exemplary embodiment herein above and as defined herein below in the claims.

We claim:

1. In a plotter which scribes on a medium, wherein the medium both moves with respect to a moving scribing pen and is driven by a drive shaft which moves the medium, the improvement comprising:
    a pressure roller which urges the medium against the drive shaft
    and a drive shaft support carriage symmetrically supporting a surface of the drive shaft opposite from the medium and said pressure roller whereby shaft flexing is minimized and accurate, aligned driving of the medium is enhanced,
    wherein said pressure roller urges the medium against the drive shaft by virtue of an eccentric operatively coupled to said pressure roller which allows the pressure roller to move from a first, unstressed position to a second position which exerts force on the drive shaft,
    wherein said eccentric includes damping means which absorb vibration caused of pressure roller contact with the drive shaft.

2. The plotter of claim 1 wherein said damping means is in the form of a spring contained within a housing which supports said pressure roller, said spring exerting pressure on said eccentric through a block which bears against an indexing cam on said eccentric.

3. The plotter of claim 2 wherein said support carriage is formed from a semicylindrical trough depending from a lower portion of said housing and extending under said pressure roller in a substantially cantilevered fashion, and a plurality of upwardly extending carriage support rollers carried on said support carriage underlying the drive shaft allowing the drive shaft to freely rotate.

4. The plotter of claim 3 wherein said housing is carried on a pen support shaft of the plotter and is allowed to float thereon by means of spring biased gall thereby damping vibration and allowing said housing to be moved along the pen support shaft by merely overcoming spring tension associated therewith.

5. A paper transport mechanism, comprising in combination:
    a pressure roller,
    a drive shaft,
    paper interposed between said pressure roller and the drive shaft,
    means for pressing said pressure roller against the shaft to provide a reliable friction drive for the paper,
    and means for negating any shaft flexing tendency caused by said pressing means, said negating means integrally formed with said pressing means whereby moving said pressure roller against the drive shaft will not cause shaft flexing.

6. The transport mechanism of claim 5 wherein said pressing means is formed by a spring biased eccentric which moves from a first to a second position applying force on the drive shaft by said pressure roller.

7. The transport mechanism of claim 6 wherein said negating means includes a support under said shaft opposing a force exerted by said pressure roller means of equal magnitude and opposite direction whereby the drive shaft merely supports the weight of said pressing means.

8. The mechanism of claim 7 wherein said negating means is embodied as a semicylindrical support carriage depending from a housing supporting said pressure roller, said negating means cantilevered from said housing to underlie said pressure roller and exert pressure upwardly opposing force from said pressure roller.

9. The mechanism of claim 8 wherein a pen support shaft attaches to said housing by means of a spring biased gall to allow said housing to float on the pen support shaft.

10. The mechanism of claim 9 wherein said spring biased eccentric includes self-aligning pressure means causing said pressure roller to align with the drive shaft and float with respect to vibration induced by motion of the drive shaft.

11. The mechanism of claim 10 wherein said eccentric includes an offset supporting said pressure roller and a cam index having two lobes for defining two positions for said pressure roller, and a spring block pressing against said lobes to provide damping and positive pressure roller alignment.

12. A method for offsetting flexing of a shaft when it is exposed to a point force transverse to its longitudinal axis the steps including:
   administering the point force from a frame,
   supporting an offsetting force administering instrumentality from the frame,
   orienting the instrumentality to diametrically oppose the point force on the shaft and
   administering the offsetting force through the shaft whereby the shaft sees forces of compression and not a bending moment,
   including administering the point of force by pressing a pressure roller against the shaft, and absorbing vibration associated with contact between the pressure roller and the drive shaft through biasing means.

13. The method of claim 12 including administering the offsetting force through the shaft by orienting the pressure roller such that it and the offsetting force are applied in a single clamping force, thereby aligning the pressure roller automatically with respect to its contact on the drive shaft.

14. The method of claim 13 including orienting the offsetting force radially with respect to the force exerted by the pressure roller providing a three point suspension system for the shaft.

15. The method of claim 14 including spacing the offsetting force from a diametrically opposed point on the shaft, spacing the opposing force symmetrically to further distribute the load along the length of the shaft.

16. The method of claim 15 including retracting the point force from the drive shaft by means of orienting an eccentric from a first force admministering position to a second retracted position.

17. The method of claim 16 including damping the vibration through spring biasing.

* * * * *